US012230026B2

United States Patent
Behzadan

(10) Patent No.: US 12,230,026 B2
(45) Date of Patent: Feb. 18, 2025

(54) MAPPING OBJECTS USING UNMANNED AERIAL VEHICLE DATA IN GPS-DENIED ENVIRONMENTS

(71) Applicant: The Texas A&M University System, College Station, TX (US)

(72) Inventor: Amir H. Behzadan, College Station, TX (US)

(73) Assignee: The Texas A&M University System, College Station, TX (US)

( * ) Notice: Subject to any disclaimer, the term of this patent is extended or adjusted under 35 U.S.C. 154(b) by 355 days.

Patent file contains an affidavit/declaration under 37 CFR 1.130(b).

(21) Appl. No.: 17/782,925

(22) PCT Filed: Dec. 6, 2020

(86) PCT No.: PCT/US2020/063517
§ 371 (c)(1),
(2) Date: Jun. 6, 2022

(87) PCT Pub. No.: WO2021/113789
PCT Pub. Date: Jun. 10, 2021

(65) Prior Publication Data
US 2023/0029573 A1     Feb. 2, 2023

Related U.S. Application Data

(60) Provisional application No. 62/944,980, filed on Dec. 6, 2019.

(51) Int. Cl.
G06V 20/13     (2022.01)
B64C 39/02     (2023.01)
(Continued)

(52) U.S. Cl.
CPC ............ *G06V 20/13* (2022.01); *B64C 39/024* (2013.01); *G06T 3/04* (2024.01); *G06T 7/74* (2017.01);
(Continued)

(58) Field of Classification Search
CPC .............. B64C 39/024; B64U 2101/30; G06F 18/2414; G06T 3/04; G06T 7/74;
(Continued)

(56) References Cited

U.S. PATENT DOCUMENTS 9,008,366 B1 *   4/2015   Kim ........................ G06T 7/246
                                                                       382/103
10,937,186 B2 *  3/2021   Wang ...................... G06V 10/82
(Continued)

OTHER PUBLICATIONS

Pi et al. "Deep neural networks for drone view localization and mapping in GPS-denied environments." 18th international conference on computing in civil and building engineering (ICCCBE). https://doi. org/10.46421/2706-6568.37. Aug. 2020. (Year: 2020).*
(Continued)

*Primary Examiner* — Katrina R Fujita
(74) *Attorney, Agent, or Firm* — Jackson Walker LLP; Leisa Talbert Peschel

(57) ABSTRACT

A method for identifying, locating, and mapping targets of interest using unmanned aerial vehicle (UAV) camera footage in GPS-denied environments. In one embodiment, the method comprises obtaining UAV visual data, passing the UAV visual data through a convolutional neural network (CNN) in order to detect targets of interest based on visual features disposed in the UAV visual data, wherein the detection by the CNN defines reference points and pixel coordinates for the UAV visual data, applying a geometric transformation to known and defined pixel coordinates to obtain real-world orthogonal positions; and projecting the
(Continued)

detected targets of interest onto an orthogonal map based on the obtained real-world orthogonal positions, all without GPS data.

16 Claims, 4 Drawing Sheets

(51) Int. Cl.
| | |
|---|---|
| *B64U 101/30* | (2023.01) |
| *G06T 3/04* | (2024.01) |
| *G06T 7/73* | (2017.01) |
| *G06V 10/46* | (2022.01) |
| *G06V 10/75* | (2022.01) |
| *G06V 10/82* | (2022.01) |
| *G06V 20/10* | (2022.01) |
| *G06V 20/17* | (2022.01) |

(52) U.S. Cl.
CPC ............ *G06V 10/751* (2022.01); *G06V 10/82* (2022.01); *G06V 20/10* (2022.01); *G06V 20/17* (2022.01); *B64U 2101/30* (2023.01); *G06T 2207/10016* (2013.01); *G06T 2207/10032* (2013.01); *G06T 2207/20081* (2013.01); *G06T 2207/20084* (2013.01); *G06T 2207/20101* (2013.01); *G06T 2207/30181* (2013.01); *G06V 10/462* (2022.01); *G06V 2201/07* (2022.01)

(58) Field of Classification Search
CPC . G06T 2207/10016; G06T 2207/10032; G06T 2207/20081; G06T 2207/20084; G06T 2207/201; G06T 2207/30181; G06V 10/462; G06V 10/751; G06V 10/82; G06V 20/10; G06V 20/13; G06V 20/17; G06V 2201/07

See application file for complete search history.

(56) References Cited

U.S. PATENT DOCUMENTS

| | | | |
|---|---|---|---|
| 2012/0237083 A1* | 9/2012 | Lange .................... | G06F 16/29 |
| | | | 382/103 |
| 2016/0379388 A1* | 12/2016 | Rasco ................... | G06Q 10/04 |
| | | | 715/753 |
| 2019/0370983 A1* | 12/2019 | Zhou ........................ | G06T 7/60 |
| 2020/0401617 A1* | 12/2020 | Spiegel ................. | G06F 16/587 |
| 2021/0158009 A1* | 5/2021 | Zhou .................... | G06V 20/176 |

OTHER PUBLICATIONS

Nassar et al. "Aerial imagery registration using deep learning for uav geolocalization." Deep Learning in Computer Vision. CRC Press, Apr. 2020. 183-210. (Year: 2020).*

Narayanan, et al., "A Real-Time Object Detection Framework for Aerial Imagery Using Deep Neural Networks and Synthetic Training Images", Proc. of SPIE, vol. 10646, 2018, 9 pages.

Pi, et al., "Convolutional neural networks for object detection in aerial imagery for disaster response and recovery", Advanced Engineering Informatics, vol. 43, 2020, 14 pages.

Goodchild, et al., "Crowdsourcing geographic information for disaster response: a research frontier", International Journal of Digital Earth, vol. 3, No. 3, Sep. 2010, pp. 231-241.

Craglia, et al., "Digital Earth from vision to practice: making sense of citizen-generated content", International Journal of Digital Earth, vol. 5, No. 5, Sep. 2012, pp. 398-416.

Radovic, et al., "Object Recognition in Aerial Images Using Convolutional Neural Networks", Journal of Imaging, vol. 3, No. 21, 2017, 9 pages.

* cited by examiner

MAPPING OBJECTS USING UNMANNED AERIAL VEHICLE DATA IN GPS-DENIED ENVIRONMENTS

CROSS-REFERENCE TO RELATED APPLICATIONS

This application claims the benefit of U.S. Provisional Application Ser. No. 62/944,980 filed Dec. 6, 2019, the disclosure of which is herein incorporated by reference in its entirety.

STATEMENT REGARDING FEDERALLY SPONSORED RESEARCH OR DEVELOPMENT

Not applicable.

BACKGROUND OF THE INVENTION

Field of the Invention

The present invention relates to a method for identifying, locating, and mapping objects and landmarks on the ground (both manmade and natural) using unmanned aerial vehicle (UAV) camera footage, particularly in GPS-denied environments.

Background of the Invention

Object mapping using geolocation information may be an important tool utilized in various societal domains including, without limitation, construction, transportation, urban planning, disaster response, agriculture, forestry, ecology, mining, and defense. Currently, rapid developments in UAV technology such as better camera resolution, longer flight ranges, and higher data storage capacity, has allowed for more efficient and less expensive remote sensing and ground surveying capabilities in UAVs, particularly at lower altitudes. However, typically accurate UAV remote sensing and ground surveying requires uninterrupted access to on-board positioning and navigation data (e.g., from GPS or inertial measurement sensors) to calculate location information and generate ground survey maps, and this data may not always be available (e.g., in GPS-denied environments). Further, UAV pilots and enthusiasts may not share certain location information due to privacy issues or lack of knowledge about geolocation meta-data.

Consequently, there is a need for a computationally efficient method for identifying, locating, and mapping objects and landmarks on the ground (both manmade and natural) using solely UAV camera footage in GPS-denied environments.

BRIEF SUMMARY OF SOME OF THE PREFERRED EMBODIMENTS

These and other needs in the art are addressed in one embodiment by a method for identifying, locating, and mapping targets of interest using UAV camera footage in GPS-denied environments, the method comprising obtaining UAV visual data, wherein the UAV visual data comprises aerial video footage comprising a plurality of frames, wherein one of the plurality of frames comprises at least four manually-selected reference points, wherein the at least four manually-selected reference points comprise known pixel coordinates and real-world orthogonal positions; passing the UAV visual data through a convolutional neural network (CNN) to detect targets of interest based on visual features disposed in each of the plurality of frames, wherein the detection by the CNN defines at least four new reference points for each of the remaining plurality of frames, and wherein the CNN defines pixel coordinates for the targets of interest for each of the remaining plurality of frames; applying a geometric transformation to the known and defined pixel coordinates to obtain real-world orthogonal positions; and projecting the detected targets of interest onto an orthogonal map based on the obtained real-world orthogonal positions.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
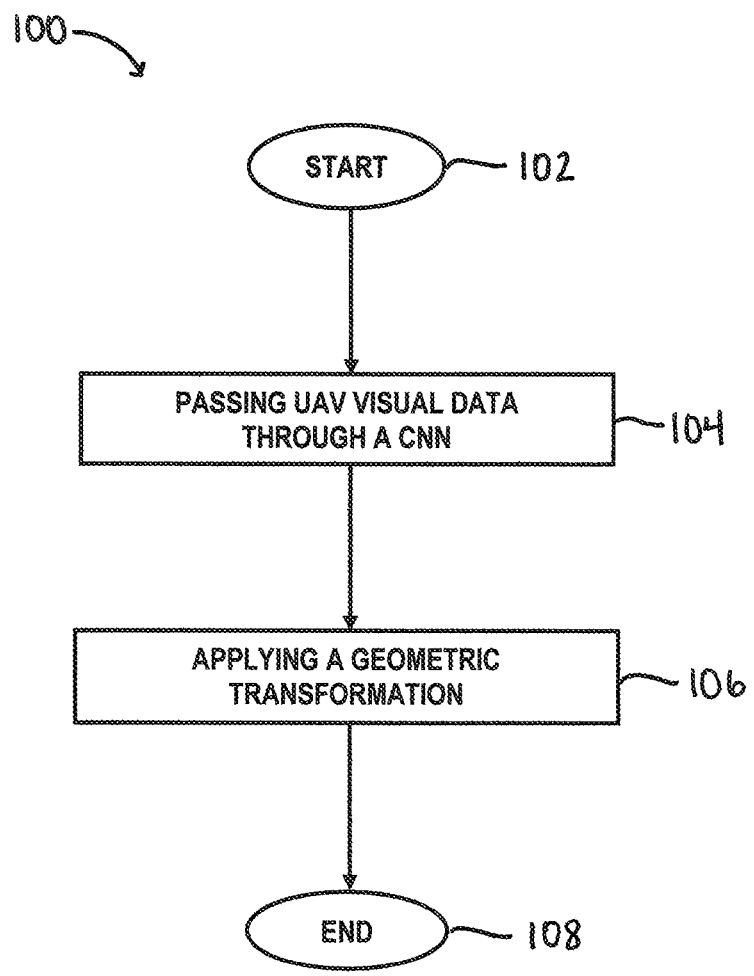
FIG. 1 is a flow diagram illustrating a method for identifying, locating, and mapping targets of interest in accordance with one embodiment of the present invention.

Advances in vision-based deep learning methods may allow for UAV data collection and navigation to move beyond the constraints of GPS-enabled environments. In particular, UAVs (e.g., drones) equipped with RGB cameras may be deployed to automatically recognize and map target objects and landmarks on the ground (both manmade and natural) using these methods. For the sake of brevity, target objects and landmarks on the ground will be referred to herein as "targets of interest." FIG. 1 is a flow diagram 100 illustrating a method for identifying, locating, and mapping targets of interest using UAV camera footage in GPS-denied environments. GPS-denied environments may include, without limitation, heavily urbanized areas, areas surrounded by dense vegetation, indoor facilities (e.g., tunnels, sheltered spaces, underground, underwater), GPS jammed locations (i.e., locations with radio signal interference that may impacting GPS signal reliability), unknown territories (e.g., battlefields, extraterrestrial exploration), or areas experiencing severe weather. In embodiments, the method (starting at Step 102) may comprise Step 104 of passing UAV visual data (e.g., aerial video footage) through a convolutional neural network (CNN) to identify and localize targets of interest in each video frame. Step 104 may be followed by Step 106 of applying a geometric transformation to instantaneously project detected targets of interest onto an orthogonal map, all without involving GPS data. The method may be complete in Step 108.

In embodiments, the UAV visual data in Step 104 may be any images or videos collected by UAVs during operation. The images or videos may comprise perspective view footage of landscapes or seascapes scattered with various targets of interest. In embodiments, the targets of interest may be, without limitation, people, cars, trucks, trailers, planes, debris, buildings, houses, roofs, equipment, livestock, crops, vegetation, trees, animals, marine animals, coral, vessels, oil spills, military adversaries, or any combinations thereof. Further, the images or videos may capture geophysical, meteorological, hydrological, and/or climatological events. In general, such visual data collected by UAVs has proven beneficial in implementing certain remote sensing methods known in the art. However, this may only be the case when on-board positioning and navigation data (e.g., from GPS or inertial measurement sensors) accompanies the UAV visual data. As previously discussed, the UAV visual data of the present invention may be collected in GPS-denied environments or by UAV operators wishing to preserve privacy and as such, may not be accompanied by UAV meta-data. In embodiments, the UAV visual data, particularly that which may be unaccompanied by on-board GPS data, may be obtained by any suitable means. For example, the UAV visual data may be obtained from public internet domains or from both amateur and professional UAV pilots (i.e., crowd-sourcing).

In embodiments, the CNN may be a class of deep neural networks applied to visual imagery analysis. The method of the present invention may utilize any suitable CNN model known in the art. In embodiments, the CNN may be built on the backbone of object detection or instance segmentation algorithms including, without limitation, YOLO (short for "You-Only-Look-Once"), SSD (short for "Single Shot Detector"), R-CNN (short for "Region-based Convolutional Neural Networks") and its variations (e.g., Mask R-CNN, Fast R-CNN, Faster R-CNN), R-FCN (short for "Region-based Fully Convolutional Network"), RetinaNet, PSPNet (short for "Pyramid Scene Parsing Network"), DSSD (short for "Deconvolutional Single Shot Detector"), or the like. The CNN used in the method may be chosen based on accuracy and speed. In embodiments, the CNN may be YOLO, Mask R-CNN, PSPNet, or RetinaNet which may lead to sufficiently high accuracy without compromising real-time speed when mapping the UAV visual data.

In embodiments, mapping the UAV visual data may be carried out in two phases. The first may be identifying targets of interest in aerial views and locating them within the image or perspective coordinate system (i.e., pixel coordinates). The second may be projecting the positions of targets of interest to the real-world or orthogonal coordinate system (i.e., real-world positions).

The first phase may be carried out in Step 104 of flow diagram 100, wherein the UAV visual data may be passed through a CNN to identify and localize targets of interest. In embodiments, particularly those in which the UAV visual data may be video footage, the identification and localization of the targets of interest may be performed for each frame in the video footage. The CNN, when trained on relevant datasets, may effectively detect objects based on visual features and output the pixel coordinates of those detected objects. In embodiments, the detected objects may be the targets of interest. As such, the CNN may identify the pixel coordinates for substantially all the targets of interest in each frame of the video footage. In embodiments, the pixel coordinates for the targets of interest may be required in performing Step 106, and thus beneficial for identifying, locating, and mapping targets of interest without on-board GPS data.

The second phase may be carried out in Step 106 of flow diagram 100, wherein the geometric transformation may be applied to perspective pixel coordinates to instantaneously project detected targets of interest onto an orthogonal map. In order to obtain the real-world orthogonal position of a point from its perspective pixel coordinates, at least four reference points with known pixel coordinates and corresponding real-world positions may be required. In embodiments, the four reference points may be selected on a single frame of the UAV visual data by a UAV operator. For example, once a UAV reaches an altitude in which a larger scene may be visible, a UAV operator may select any four reference points of his/her choice, particularly without revealing his/her exact location. In embodiments, the four reference points may be chosen as coplanar points and with any three of the four points as non-collinear. Due to the nature of selection, the pixel coordinates as well as the corresponding real-world positions are known and available. For instance, the real-world coordinates may be extracted when a UAV operator selects the four reference points on the GUI of a mapping system (e.g., Google Maps has longitude and latitude information of all points already stored and available to the public). Additionally, the pixel coordinates may be extracted by the CNN which was discussed in greater detail above. The four reference points may be required to achieve accurate homography transformation for the UAV visual data. In embodiments in which the UAV visual data may be video footage, the four reference points may only be selected manually for a single frame. Preceding and succeeding frames in the video footage may also require four references to complete homography transformation, however these reference points may be automatically selected by the CNN during the operation. For the manually-selected reference point, a UAV operator may be prompted or suggested to select four reference points that appear to be on the same plane. For example, without limitation, the four reference points may be on building roofs that are the same height or on a flooded road (water level is typically always planar). In some embodiments, the CNN, trained to detect various objects and landmarks on the ground, may be capable of automatically identifying and recommending viable reference points.

Figure 2:
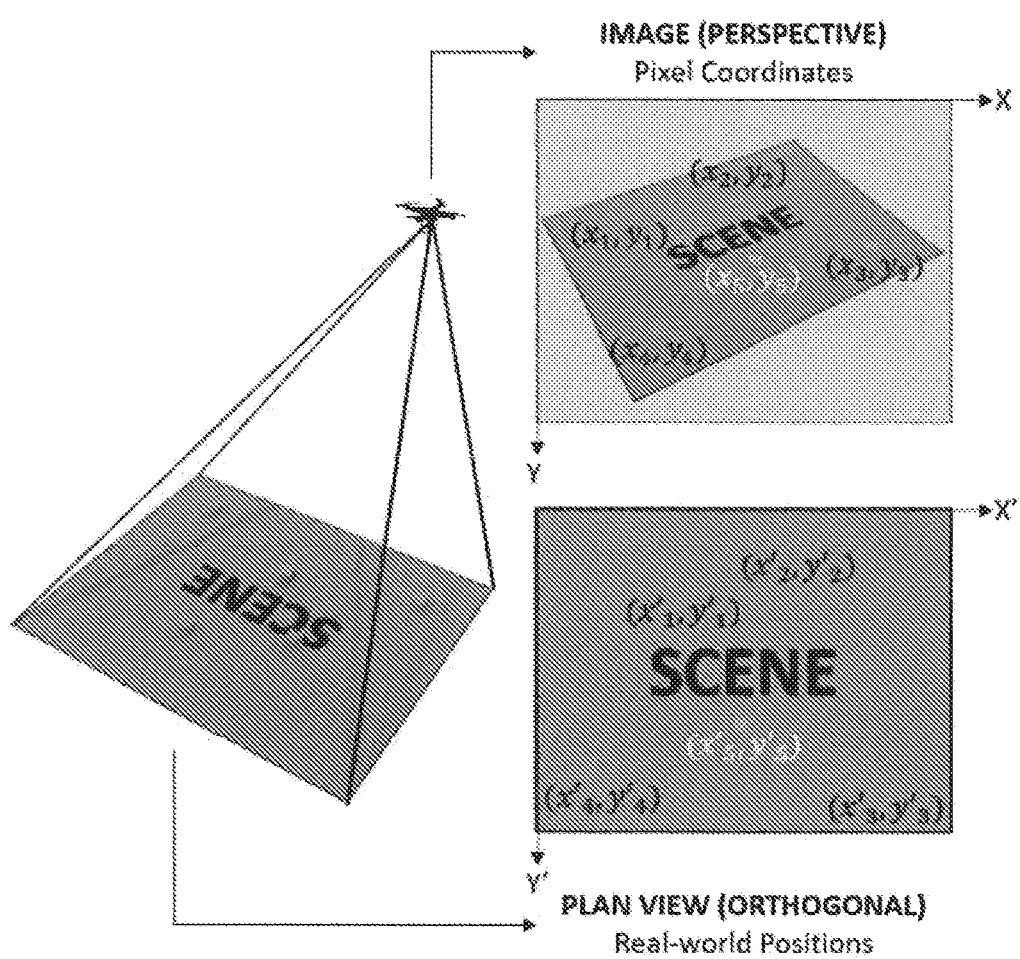
FIG. 2 illustrates an example in which pixel coordinates of reference points are converted into corresponding real-world positions in accordance with one embodiment of the present invention.

FIG. 2 illustrates an example in which pixel coordinates of the four reference points are $(x_1, y_1)$, $(x_2, y_2)$, $(x_3, y_3)$, and $(x_4, y_4)$, and corresponding real-world positions are $(x_1', y_1')$, $(x_2', y_2')$, $(x_3', y_3')$, respectively. Given M, the real-world position $(x_5', y_5')$ of any point (i.e., ground target of interest) may be calculated from its pixel coordinates $(x_5, y_5)$ using Equations 6 and 7 below. In Equation 6, $(x_5'', y_5'', w)$ may represent the point's position in a homogenous coordinate system where $1/w$ may be the distance of the point from the camera (i.e., $w=0$ represents a point that is at an infinite distance).

$$\begin{bmatrix} x_1 & x_2 & x_3 \\ y_1 & y_2 & y_3 \\ 1 & 1 & 1 \end{bmatrix} \cdot \begin{bmatrix} a_1 \\ a_2 \\ a_3 \end{bmatrix} = \begin{bmatrix} x_4 \\ y_4 \\ 1 \end{bmatrix} \quad \#(1)$$

$$A = \begin{bmatrix} a_1 \cdot x_1 & a_2 \cdot x_2 & a_3 \cdot x_3 \\ a_1 \cdot y_1 & a_2 \cdot y_2 & a_3 \cdot y_3 \\ a_1 & a_2 & a_3 \end{bmatrix} \quad \#(2)$$

$$\begin{bmatrix} x'_1 & x'_2 & x'_3 \\ y'_1 & y'_2 & y'_3 \\ 1 & 1 & 1 \end{bmatrix} \cdot \begin{bmatrix} b_1 \\ b_2 \\ b_3 \end{bmatrix} = \begin{bmatrix} x'_4 \\ y'_4 \\ 1 \end{bmatrix} \quad \#(3)$$

$$B = \begin{bmatrix} b_1 \cdot x'_1 & b_2 \cdot x'_2 & b_3 \cdot x'_3 \\ b_1 \cdot y'_1 & b_2 \cdot y'_2 & b_3 \cdot y'_3 \\ b_1 & b_2 & b_3 \end{bmatrix} \quad \#(4)$$

$$M = B \cdot A^{-1} \quad \#(5)$$

$$\begin{bmatrix} x''_5 \\ y''_5 \\ w \end{bmatrix} = M \cdot \begin{bmatrix} x_5 \\ y_5 \\ 1 \end{bmatrix} \quad \#(6)$$

$$x'_5 = \frac{x''_5}{w}, \; y'_5 = \frac{y''_5}{w} \quad \#(7)$$

In embodiments, once the CNN of step 104 identifies the pixel coordinates of the four reference points and the targets of interest, the real-world positions for the targets of interests may be obtained given the real-world positions of the four reference points. As previously mentioned, the real-world positions of the four reference points may be obtained from prior knowledge based on the selection process used by a UAV operator. In some embodiments, the real-world positions of the four reference points may be obtained from a plan-view image using the ratio between detected size of an object and its known actual physical size. By obtaining the real-world positions for the targets of interests an accurate homography transformation may be achieved, and thus accurately identifying, locating, and mapping targets of interest using UAV camera footage in GPS-denied environments may be achieved.

Figure 3:
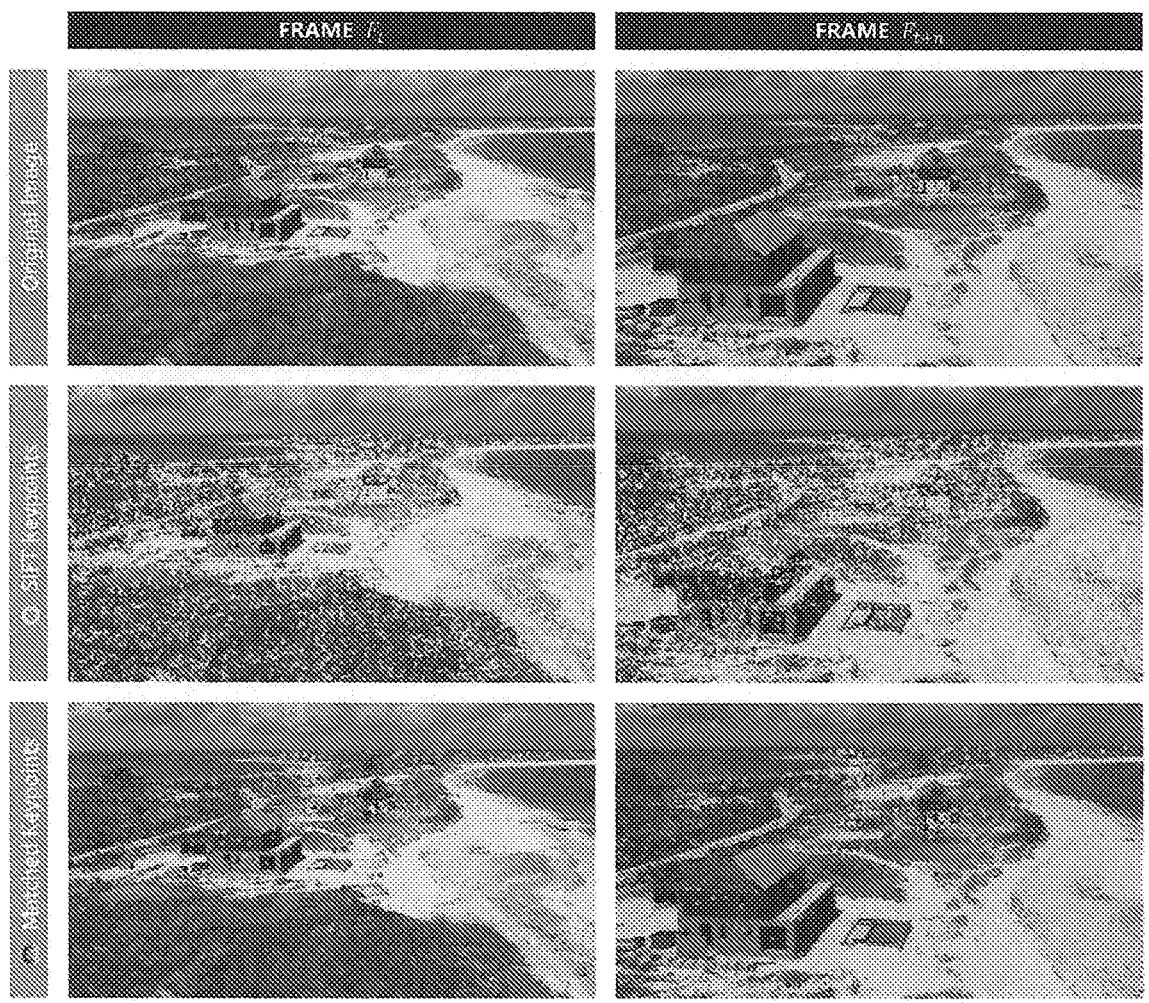
FIG. 3 illustrates the use of scale-invariant feature transform (SIFT) and random sample consensus (RANSAC) methods in accordance with one embodiment of the present invention.

In further embodiments, the method illustrated in flow diagram 100 may utilize various software tools to aid in accurately identifying, locating, and mapping targets of interest using UAV camera footage in GPS-denied environments. FIG. 3 illustrates the use of scale-invariant feature transform (SIFT) and random sample consensus (RANSAC) methods for selecting matching keypoints between two video frames, a primary frame and a secondary frame, in the UAV visual data. In embodiments, SIFT may identify matching point candidates between the primary and the secondary frames. RANSAC may aid in eliminating outliers from a set of matching point candidates identified by SIFT while removing incorrectly matched features. A set of matched keypoints may be ideal for selecting four new reference points on the secondary frame without UAV operator input. As previously discussed, the four reference points may be required to construct a homography transformation. In embodiments, the SIFT and RANSAC methods may be performed on all frames in the UAV visual data.

Figure 4:
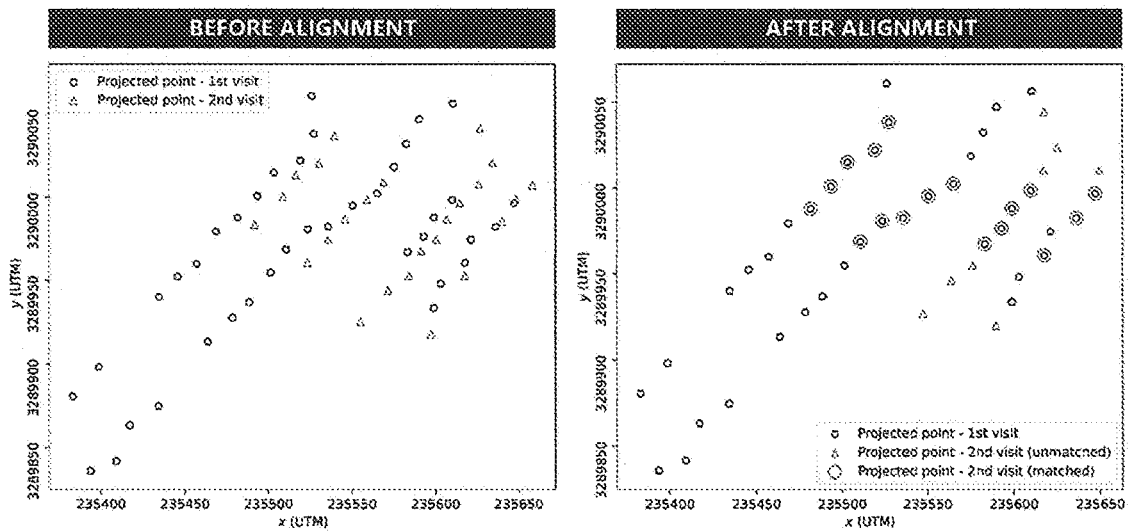
FIG. 4 illustrates the use of iterative closest point (ICP) method in accordance with one embodiment of the present invention.

FIG. 4 illustrates the use of iterative closest point (ICP) method to reconcile accumulated mapping error when a UAV traverses an area or revisits the same points twice. In embodiments, ICP may transform one point cloud (i.e., projected points in the second visit) to another (i.e., projected points in the first visit). ICP may be accomplished by employing a series of matrix operations such as rotation, translation, and scaling. In embodiments, ICP may be performed during post-processing to align the projected points from the second visit to the projected points from the first visit, thus ensuring the output of the mapping process does not accumulate excessive drift (error).

Figure 5:
FIG. 5 illustrates an example of a mapped target of interest in accordance with one embodiment of the present invention.

In embodiments, a system that may implement the method illustrated in flow diagram 100 may produce output such as a mapped target of interest. FIG. 5 illustrates an example of a mapped target of interest. As illustrated, a flooded area may be overlaid on a geocoded map. This area may be used to assess the extent of damage to the built environment and infrastructure, estimate the time it takes for floodwaters to drain, design intelligent wayfinding models that avoid flooded roads, or even evacuate victims with minimum disruption. The darker shades indicate points that were visible to the UAV in more video frames. In embodiments, the method may be used to map both countable objects (e.g., buildings) and bulk objects (e.g., flooded areas) because internally, the algorithm deals with "points" not particular shapes.

Although the present invention and its advantages have been described in detail, it should be understood that various changes, substitutions, and alterations may be made herein without departing from the spirit and scope of the invention as defined by the appended claims.

What is claimed is:

1. A method for identifying, locating, and mapping targets of interest using UAV camera footage in GPS-denied environments, the method comprising:
(A) obtaining UAV visual data, wherein the UAV visual data comprises aerial video footage comprising a plurality of frames, wherein one of the plurality of frames comprises at least four manually-selected reference points, wherein the at least four manually-selected reference points comprise known pixel coordinates and real-world orthogonal positions;
(B) passing the UAV visual data through a convolutional neural network (CNN) to detect targets of interest based on visual features disposed in each of the plurality of frames, wherein the detection by the CNN defines at least four new reference points for each of the remaining plurality of frames, and wherein the CNN defines pixel coordinates for the targets of interest for each of the remaining plurality of frames;
(C) applying a geometric transformation to the known and defined pixel coordinates to obtain real-world orthogonal positions; and
(D) projecting the detected targets of interest onto an orthogonal map based on the obtained real-world orthogonal positions.

2. The method of claim 1, wherein the GPS-denied environments comprise heavily urbanized areas, areas surrounded by dense vegetation, indoor facilities, GPS-jammed locations, unknown territories, areas experiencing severe weather, or any combinations thereof.

3. The method of claim 1, wherein the UAV visual data comprised geophysical, meteorological, hydrological, and/or climatological events.

4. The method of claim 1, wherein the UAV visual data is obtained via crowdsourcing.

5. The method of claim 1, wherein the CNN is trained on relevant datasets to effectively detect the targets of interest and output the pixel coordinates of the targets of interest.

6. The method of claim 1, wherein the CNN may be YOLO, Mask R-CNN, PSPNet, or RetinaNet.

7. The method of claim 1, wherein the geometric transformation 1s a homography transformation.

8. The method of claim 1, wherein the at least four manually-selected reference points are chosen by a UAV operator.

9. The method of claim 1, wherein the at least four manually-selected reference points are suggested to a UAV operator by the CNN.

10. The method of claim 1, wherein three of the at least four reference points are non-collinear.

11. The method of claim 1, further comprising selecting matching keypoints between two consecutive frames of the plurality of frames via SIFT and RANSAC methods.

12. The method of claim 11, wherein the selecting of matching keypoints is repeated for each of the plurality of frames.

13. The method of claim 11, wherein the SIFT method comprises identifying matching keypoint candidates between the two consecutive frames.

14. The method of claim 11, wherein the RANSAC method comprises eliminating outliers from a set of matching keypoint candidates identified by the SIFT method while removing incorrectly matched keypoints.

15. The method of claim 1, further comprising reconciling accumulated mapping error when a UAV traverses an area or revisits the same points twice via iterative closest point (ICP) method.

16. The method of claim 1, wherein the method is performed without using data from GPS or inertial measurement sensors of the UAV.

* * * * *